US011349886B2

(12) United States Patent
Yang et al.

(10) Patent No.: US 11,349,886 B2
(45) Date of Patent: May 31, 2022

(54) CONTROL METHOD OF MULTIMEDIA CONFERENCE TERMINAL AND MULTIMEDIA CONFERENCE SERVER

(71) Applicant: ZTE CORPORATION, Guangdong (CN)

(72) Inventors: Yang Yang, Guangdong (CN); Liang Yang, Guangdong (CN); Qiang Zhang, Guangdong (CN); Gang Yao, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 83 days.

(21) Appl. No.: 16/630,359

(22) PCT Filed: Jul. 10, 2018

(86) PCT No.: PCT/CN2018/095182
§ 371 (c)(1),
(2) Date: Jan. 10, 2020

(87) PCT Pub. No.: WO2019/011246
PCT Pub. Date: Jan. 17, 2019

(65) Prior Publication Data
US 2020/0162524 A1 May 21, 2020

(30) Foreign Application Priority Data
Jul. 11, 2017 (CN) .......................... 201710561967.0

(51) Int. Cl.
*H04L 65/1073* (2022.01)
*H04L 9/40* (2022.01)
(Continued)

(52) U.S. Cl.
CPC ........ *H04L 65/1073* (2013.01); *H04L 63/101* (2013.01); *H04L 65/1083* (2013.01); *H04L 65/403* (2013.01)

(58) Field of Classification Search
CPC .............. H04L 65/1073; H04L 63/101; H04L 65/1083; H04L 65/403; H04N 7/147; H04N 7/15
See application file for complete search history.

(56) References Cited

U.S. PATENT DOCUMENTS 9,560,316 B1 * 1/2017 Lindberg ................ G10L 21/10
9,641,801 B2   5/2017 Chen et al.
(Continued)

FOREIGN PATENT DOCUMENTS

CA      2633930 A1   12/2008
CN   101729828 A    6/2010
(Continued)

OTHER PUBLICATIONS

India Patent Office, First Office Action (OA1) dated Mar. 10, 2021 regarding IN202017002007.
(Continued)

*Primary Examiner* — Jason D Recek

(57) ABSTRACT

Embodiments of the present disclosure provide a control method of a multimedia conference terminal and a multimedia conference server. The control method of the multimedia conference terminal includes: determining whether multimedia information of a conference site collected by the multimedia conference terminal meets a preset condition; if the multimedia information does not meet the preset condition, acquiring multimedia information of the conference site collected by the multimedia conference terminal; and if the multimedia information meets the preset condition, closing the multimedia conference terminal.

4 Claims, 4 Drawing Sheets

(51) Int. Cl.
*H04L 65/1083* (2022.01)
*H04L 65/403* (2022.01)

(56) References Cited

U.S. PATENT DOCUMENTS

| | | | |
|---|---|---|---|
| 2003/0090564 A1 | 5/2003 | Strubbe | |
| 2011/0157366 A1 | 6/2011 | Padmanabh et al. | |
| 2012/0327176 A1* | 12/2012 | Kee | H04N 7/15 |
| | | | 348/E7.083 |
| 2016/0028896 A1* | 1/2016 | Schellekens | H04R 3/005 |
| | | | 370/260 |
| 2016/0065895 A1* | 3/2016 | Chen | H04S 7/40 |
| | | | 348/14.08 |
| 2016/0192233 A1 | 6/2016 | Sarker et al. | |
| 2018/0082264 A1* | 3/2018 | Szeto | G06Q 10/1095 |

FOREIGN PATENT DOCUMENTS

| | | |
|---|---|---|
| CN | 202548845 U | 11/2012 |
| CN | 104052764 A | 9/2014 |
| CN | 105262975 A | 1/2016 |
| CN | 105376515 A | 3/2016 |
| CN | 105812717 A | 7/2016 |
| CN | 106789914 A | 5/2017 |
| EP | 2712180 A1 | 3/2014 |

OTHER PUBLICATIONS

European Patent Office, Extended European Search Report dated Feb. 15, 2021 regarding EP18831572.5.
WIPO, International Search Report dated Sep. 19, 2018.
China Patent Office, First Office Action (OA1) dated Nov. 20, 2020 regarding CN201710561967.0.

* cited by examiner

CONTROL METHOD OF MULTIMEDIA CONFERENCE TERMINAL AND MULTIMEDIA CONFERENCE SERVER

CROSS-REFERENCE TO RELATED APPLICATIONS

This is a National Phase Application filed under 35 U.S.C. 371 as a national stage of PCT/CN2018/095182, filed on Jul. 10, 2018, an application claiming the priority of Chinese Patent Application No. 201710561967.0, filed on Jul. 11, 2017, the contents of which are incorporated herein in their entirety by reference.

TECHNICAL FIELD

The present disclosure relates to the field of multimedia communication technologies, and in particular, to a control method of a multimedia conference terminal and a multimedia conference server.

BACKGROUND

Terminals in a video conference system are classified into two categories, namely, hardware terminals and software terminals. A hardware terminal is generally placed in a conference room due to poor mobility, but has good stability and definition, and a can use a high-definition television as output. A software terminal is generally installed on a mobile phone, a PAD (tablet computer), a notebook and other devices, and has good mobility, but has ordinary stability and definition. In an actual conference system, there is a scene where multiple software terminals and hardware terminals join a same conference at the same time.

In the video conference system, each conference occupies certain system resources, which include a bandwidth resource, video encoding and decoding resources, etc., and may also include a conference room resource, according to the situation of the conference. Usually, one conference room corresponds to one hardware terminal, and several persons attending the conference may be present in a same conference room at the same time.

In general, a conference or conference room resource is managed in such a way that the conference and the conference room related to the conference is reserved in advance by a user or an administrator and used by the reservation user within the reserved time period. Since the user usually does not know the duration actually required by the conference, time is reserved as long as possible to ensure the conference is smoothly carried out. Therefore, if the conference ends early, conference resources and the conference room are occupied, which causes resource waste. In such a management way, the resource utilization rate of the conference room and the conference is not high.

SUMMARY

According to an aspect of the present disclosure, there is provided a control method of a multimedia conference terminal, including: determining whether multimedia information of a conference site collected by the multimedia conference terminal meets a preset condition; if the multimedia information does not meet the preset condition, acquiring multimedia information of the conference site collected by the multimedia conference terminal; and if the multimedia information meets the preset condition, closing the multimedia conference terminal.

According to another aspect of the present disclosure, there is provided a multimedia conference server including: a determination module configured to determine whether multimedia information of a conference site collected by the multimedia conference terminal meets a preset condition; an acquisition module configured to acquire multimedia information of the conference site collected by the multimedia conference terminal if the determination module determines that the multimedia information does not meet the preset condition; and a control module configured to close the multimedia conference terminal if the determination module determines that the multimedia information meets the preset condition.

According to still another aspect of the present disclosure, there is provided a multimedia conference server including a memory on which a computer program is stored and a processor that executes the computer program to perform the control method of a multimedia conference terminal according to the present disclosure.

According to still yet another aspect of the present disclosure, there is provided a computer-readable storage medium having stored thereon a computer program which, when executed by a processor, causes the processor to perform the control method of a multimedia conference terminal according to the present disclosure.

DETAILED DESCRIPTION

In order to make the technical solutions and advantages of the present disclosure clearer, the present disclosure will be described in detail below with reference to the accompanying drawings and embodiments.

The terms "first," "second," and the like in the description and in the claims of the present disclosure are used for distinguishing between similar elements and not necessarily for describing a particular sequential or chronological order. It is to be understood that the terms so used are interchangeable under appropriate circumstances such that the embodiments of the present disclosure described herein are, for example, capable of operation in sequences other than those illustrated or described herein.

Figure 1:
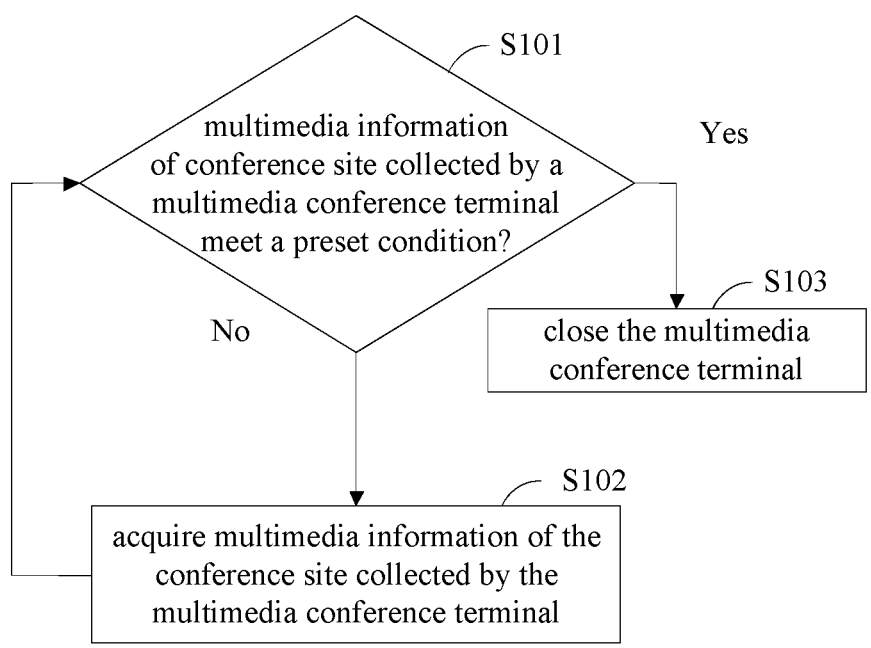
FIG. 1 is a flowchart of a control method of a multimedia conference terminal according to an embodiment of the present disclosure.

FIG. 1 is a flowchart of a control method of a multimedia conference terminal according to an embodiment of the present disclosure.

Referring to FIG. 1, a control method of a multimedia conference terminal according to an embodiment of the present disclosure may include steps S101 to S103.

In step S101, it is determined whether multimedia information of a conference site collected by a multimedia conference terminal meets a preset condition. If the preset condition is not met, step S102 is executed; if the preset condition is met, step S103 is executed.

In an embodiment of the present disclosure, the multimedia information may include first multimedia information and second multimedia information which is collected to prevent a false shutdown. The first multimedia information is collected from the conference site by the multimedia conference terminal, and the second multimedia information is collected from the conference site in a specified time period after the first multimedia information is determined to meet the preset condition. The first multimedia information and the second multimedia information may be audio information and/or video information. It should be noted that the first multimedia information and the second multimedia information may be of a same type or different types, for example, when the first multimedia information is audio information, the second multimedia information may be audio information and/or video information.

According to an embodiment of the present disclosure, step S101 may include: determining whether the first multimedia information of the conference site collected by the multimedia conference terminal meets a first preset condition; if the first multimedia information does not meet the first preset condition, determining that the multimedia information does not meet the preset condition; if the first multimedia information meets the first preset condition, displaying notification information on the multimedia conference terminal and determining whether the second multimedia information of the conference site collected by the multimedia conference terminal meets a second preset condition; if the second multimedia information does not meet the second preset condition, determining that the multimedia information does not meet the preset condition; and if the second multimedia information meets the second preset condition, determining that the multimedia information meets the preset condition.

As described above, the first multimedia information and the second multimedia information may be audio information and/or video information, and therefore, determining whether the multimedia information of the conference site collected by the multimedia conference terminal meets the preset condition may include the following cases.

Case 1: The First Multimedia Information and the Second Multimedia Information are Both Audio Information If the first multimedia information has a volume smaller than a preset first volume threshold, and a first state corresponding to that the volume of the first multimedia information is smaller than the preset first volume threshold lasts a first duration exceeding a preset first time threshold, it is determined that the first multimedia information meets the first preset condition; and if the second multimedia information has a volume is smaller than a preset second volume threshold and a fourth state corresponding to that the volume of the second multimedia information is smaller than the preset second volume threshold lasts a fourth duration exceeding a preset fourth time threshold, it is determined that the second multimedia information meets the second preset condition. When the first multimedia information meets the first preset condition and the second multimedia information meets the second preset condition, the multimedia information can be determined to meet the preset condition so that the multimedia conference terminal is closed.

Case 2: The First Multimedia Information and the Second Multimedia Information are Both Video Information If no portrait can be recognized from the first multimedia information and a second state corresponding to that no portrait can be recognized from the first multimedia information lasts a second duration exceeding a preset second time threshold, it is determined that the first multimedia information meets the first preset condition; and if no portrait can be recognized from the second multimedia information and a third state corresponding to that no portrait can be recognized from the second multimedia information lasts a third duration exceeding a preset third time threshold, it is determined that the second multimedia information meets the second preset condition. When the first multimedia information meets the first preset condition and the second multimedia information meets the second preset condition, the multimedia information can be determined to meet the preset condition, so that the multimedia conference terminal is closed.

Case 3: The First Multimedia Information is Audio Information and the Second Multimedia Information is Video Information If the first multimedia information has a volume smaller than the preset first volume threshold and the first state corresponding to that the volume of the first multimedia information is smaller than the preset first volume threshold lasts the first duration exceeding the preset first time threshold, it is determined that the first multimedia information meets the first preset condition; and if no portrait can be recognized from the second multimedia information and the third state corresponding to that no portrait can be recognized from the second multimedia information lasts the third duration exceeding the preset third time threshold, it is determined that the second multimedia information meets the second preset condition. When the first multimedia information meets the first preset condition and the second multimedia information meets the second preset condition, the multimedia information can be determined to meet the preset condition, so that the multimedia conference terminal is closed.

Case 4: The First Multimedia Information is Video Information and the Second Multimedia Information is Audio Information If no portrait can be recognized from the first multimedia information and the second state corresponding to that no portrait can be recognized from the first multimedia information lasts the second duration exceeding the preset second time threshold, it is determined that the first multimedia information meets the first preset condition; and if the second multimedia information has a volume smaller than the preset second volume threshold and the fourth state corresponding to that the volume of the second multimedia information is smaller than the preset second volume threshold lasts the second duration exceeding the preset fourth time threshold, it is determined that the second multimedia information meets the second preset condition. When the first multimedia information meets the first preset condition and the second multimedia information meets the second preset condition, the multimedia information can be determined to meet the preset condition, so that the multimedia conference terminal is closed.

Case 5: The First Multimedia Information and the Second Multimedia Information are Both Audio and Video Information If the first multimedia information has a volume smaller than a preset third volume threshold and no portrait can be recognized from the first multimedia information, and a fifth state corresponding to that the volume of the first multimedia information is smaller than the preset third volume threshold and no portrait can be recognized from the first multimedia information lasts a fifth duration exceeding a preset fifth time threshold, it is determined that the first multimedia information meets the first preset condition; and if the second multimedia information has a volume smaller than a preset fourth volume threshold and no portrait can be recognized from the second multimedia information, and a sixth state corresponding to that the volume of the second multimedia information is smaller than the preset fourth volume threshold and no portrait can be recognized from the second multimedia information lasts a sixth duration exceeding a preset sixth time threshold, it is determined that the second multimedia information meets the second preset condition. When the first multimedia information meets the first preset condition and the second multimedia information meets the second preset condition, the multimedia information can be determined to meet the preset condition, so that the multimedia conference terminal is closed.

In the embodiments of the present disclosure, specific implementations of determining whether the multimedia information of the conference site collected by the multimedia conference terminal meets the preset condition are not limited to the above five cases, and the five cases are only exemplary. It can be understood that, in the embodiments of the present disclosure, the specific implementation of determining whether the multimedia information of the conference site collected by the multimedia conference terminal meets the preset condition is not specifically limited.

In step S102, multimedia information of the conference site collected by the multimedia conference terminal is acquired.

In step S103, the multimedia conference terminal is closed.

According to the embodiments of the disclosure, after receiving multimedia information of a conference site collected by a multimedia conference terminal, it is first determined whether the multimedia information of the conference site collected by the multimedia conference terminal meets a preset condition. If the multimedia information meets the preset condition, the multimedia conference terminal can be closed, so that utilization efficiency of sources including a system resource and a conference room resource can be improved.

In order to facilitate understanding of the flow of the control method of the multimedia conference terminal, the case exemplified in the above Case 1 will be specifically described below.

If input energy of audio data collected by the terminal is always smaller than a normal value in a certain time period and no human voice is recognized, the terminal may be considered to have no people speaking at present and be in a closable state. In this case, notification information may be displayed on a conference control page or a terminal list page to notify that the multimedia conference terminal is about to be closed. After that, if the collected audio data is detected to change, the terminal is restored to a normal state, and the above process is restarted; if the collected audio data is detected to always indicate that no human voice is recognized, the multimedia conference terminal can be closed.

Figure 2:
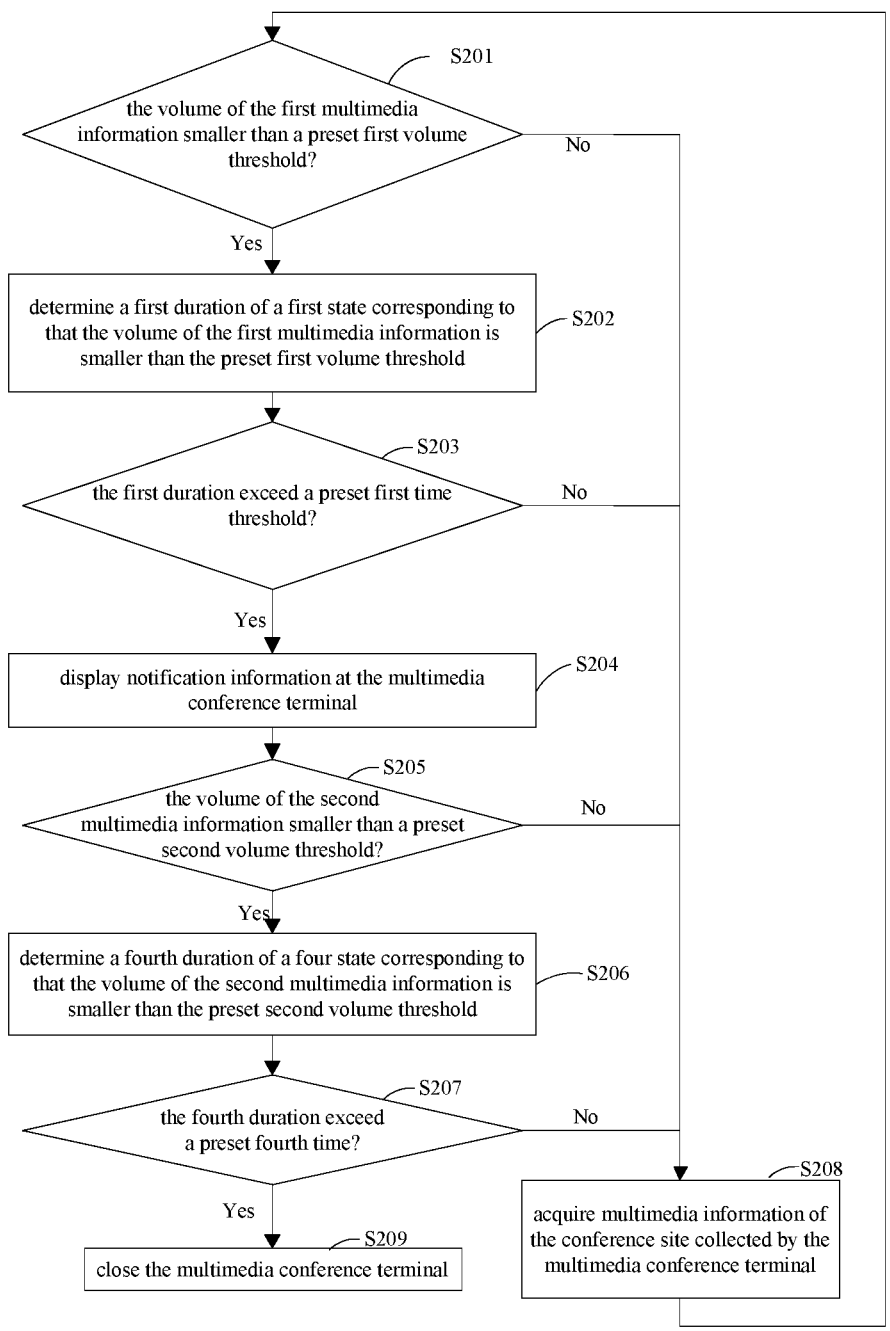
FIG. 2 is a flowchart of a control method of a multimedia conference terminal according to another embodiment of the present disclosure.

FIG. 2 is a flowchart of a control method of a multimedia conference terminal according to another embodiment of the present disclosure, that is, FIG. 2 shows the above determination process.

Referring to FIG. 2, a control method of a multimedia conference terminal according to another embodiment of the present disclosure may include steps S201 to S209.

In step S201, whether the volume of the first multimedia information is smaller than the preset first volume threshold is determined. If the volume of the first multimedia information is larger than or equal to the preset first volume threshold, it is determined that the first multimedia information does not meet the first preset condition and step S208 is executed; if the volume of the first multimedia information is smaller than the preset first volume threshold, step S202 is executed.

In step S202, the first duration of the first state corresponding to that the volume of the first multimedia information is smaller than the preset first volume threshold is determined.

In step S203, whether the first duration exceeds the preset first time threshold is determined. If the first duration exceeds the preset first time threshold, step S204 is executed; if the first duration does not exceed the preset first time threshold, it is determined that the first multimedia information does not meet the first preset condition and step S208 is executed.

In step S204, notification information is displayed at the multimedia conference terminal.

In step S205, whether the volume of the second multimedia information is smaller than the preset second volume threshold is determined. If the volume of the second multimedia information is larger than or equal to the preset second volume threshold, it is determined that the multimedia information does not meet the preset condition and step S208 is executed; and if the volume of the second multimedia information is smaller than the preset second volume threshold, step S206 is executed.

In step S206, the fourth duration of the four state corresponding to that the volume of the second multimedia information is smaller than the preset second volume threshold is determined.

In step S207, whether the fourth duration exceeds the preset fourth time threshold is determined. If the fourth duration exceeds the preset fourth time threshold, it is determined that the second multimedia information meets the second preset condition (i.e., the multimedia information meets the preset condition) and step S209 is executed; if the fourth duration does not exceed the preset fourth time threshold, it is determined that the second multimedia information does not meet the second preset condition and step S208 is executed.

In step S208, the multimedia information of the conference site collected by the multimedia conference terminal is acquired.

In step S209, the multimedia conference terminal is closed.

Similarly, for the above Case 2 involving video information, if no portrait can be recognized from video data collected by the terminal all the time within a certain time period, it can be considered that there is no people in the conference site where the terminal is located, and the terminal is in a closable state. In this case, notification information may be displayed on a conference control page or a terminal list page to notify that the multimedia conference terminal is about to be closed. After that, if the collected video information is detected to change, the terminal is restored to a normal state, and the above process is restarted; if the collected information is detected to always indicate that no portrait is recognized, the multimedia conference terminal can be closed.

For example, the control method of the multimedia conference terminal corresponding to the above Case 2 may include determining whether a portrait can be recognized from the first multimedia information. If a portrait can be recognized from the first multimedia information, it is determined that the first multimedia information does not meet the first preset condition (i.e., the multimedia information does not meet the preset condition); and if no portrait can be recognized from the first multimedia information, the second duration of the second state corresponding to that no portrait can be recognized from the first multimedia information is determined, and whether the second duration exceeds the preset second time threshold is determined. If the second duration does not exceed the preset second time threshold, it is determined that the first multimedia information does not meet the first preset condition (i.e., the multimedia information does not meet the preset condition); and if the second duration exceeds the preset second time threshold, notification information is displayed at the multimedia conference terminal, and whether a portrait can be recognized from the second multimedia information is determined. If a portrait can be recognized from the second multimedia information, it is determined that the second multimedia information does not meet the second preset condition (i.e., the multimedia information does not meet the preset condition); and if no portrait can be recognized from the second multimedia information, the third duration of the third state corresponding to that no portrait can be recognized from the second multimedia information is determined, and whether the third duration exceeds the preset third time threshold is determined. If the third duration exceeds the preset third time threshold, it is determined that the second multimedia information meets the second preset condition (i.e., the multimedia information meets the preset condition); and if the third duration does not exceed the preset third time threshold, it is determined that the second multimedia information does not meet the second preset condition (i.e., the multimedia information does not meet the preset condition). In the case of determining that the multimedia information does not meet the preset condition, the multimedia information of the conference site collected by the multimedia conference terminal may be continuously acquired; and in the case of determining that the multimedia information meets the preset condition, the multimedia conference terminal may be closed.

Similarly, for the above Case 5 involving audio information and video information, the control method of a multimedia conference terminal according to an embodiment of the present disclosure may include: determining whether the first multimedia information has a volume smaller than the preset third volume threshold and whether a portrait can be recognized from the first multimedia information. If the volume of the first multimedia information is larger than or equal to the preset third volume threshold or a portrait can be recognized from the first multimedia information, it is determined that the first multimedia information does not meet the first preset condition (i.e., the multimedia information does not meet the preset condition); if the volume of the first multimedia information is smaller than the preset third volume threshold and no portrait can be recognized from the first multimedia information, the fifth duration of the fifth state corresponding to that the volume of the first multimedia information is smaller than the preset third volume threshold and no portrait can be recognized from the first multimedia information is determined, and whether the fifth duration exceeds the preset fifth time threshold is determined. If the fifth duration does not exceed the preset fifth time threshold, it is determined that the first multimedia information does not meet the first preset condition (i.e., the multimedia information does not meet the preset condition); and if the fifth duration exceeds the preset fifth time threshold, notification information is displayed at the multimedia conference terminal, and whether the second multimedia information has a volume less than the preset fourth volume threshold and whether a portrait can be recognized from the second multimedia information are determined. If the volume of the second multimedia information is larger than or equal to the preset fourth volume threshold or a portrait can be recognized from the second multimedia information, it is determined that the second multimedia information does not meet the second preset condition (i.e., the multimedia information does not meet the preset condition); if the volume of the second multimedia information is smaller than the preset fourth volume threshold and no portrait can be recognized from the second multimedia information, the sixth duration of the sixth state corresponding to that the volume of the second multimedia information is smaller than the preset fourth volume threshold and no portrait cannot be recognized from the second multimedia information is determined, and whether the sixth duration exceeds the preset sixth time threshold is determined. If the sixth duration exceeds the preset sixth time threshold, it is determined that the second multimedia information meets the second preset condition (i.e., the multimedia information meets the preset condition); and if the sixth duration does not exceed the preset sixth time threshold, it is determined that the second multimedia information does not meet the second preset condition (i.e., the multimedia information does not meet the preset condition). In the case of determining that the multimedia information does not meet the preset condition, the multimedia information of the conference site collected by the multimedia conference terminal may be continuously acquired; and in the case of determining that the multimedia information meets the preset condition, the multimedia conference terminal may be closed.

According to the embodiments of the present disclosure, whether multimedia information of a conference site collected by a multimedia conference terminal meets a preset condition is preliminarily determined by determining whether a portrait can be recognized from a first multimedia information collected by the multimedia conference terminal and/or determining whether the first multimedia information has a volume smaller than a preset volume threshold, and determining whether a duration of a state in which no portrait can be recognized from the first multimedia information and/or the volume of the first multimedia information is smaller than the preset volume threshold exceeds a preset time threshold. If the multimedia information is preliminarily determined to meet the preset condition, notification information is displayed at the multimedia conference terminal to notify that the multimedia conference terminal is about to be closed. After that, if still no portrait can be recognized from a second multimedia information collected from the multimedia conference terminal within a certain time period and/or the second multimedia information still has a volume smaller than a preset volume threshold, the multimedia conference terminal is closed to improve utilization efficiency of sources including a system resource and a conference room resource.

Figure 3:
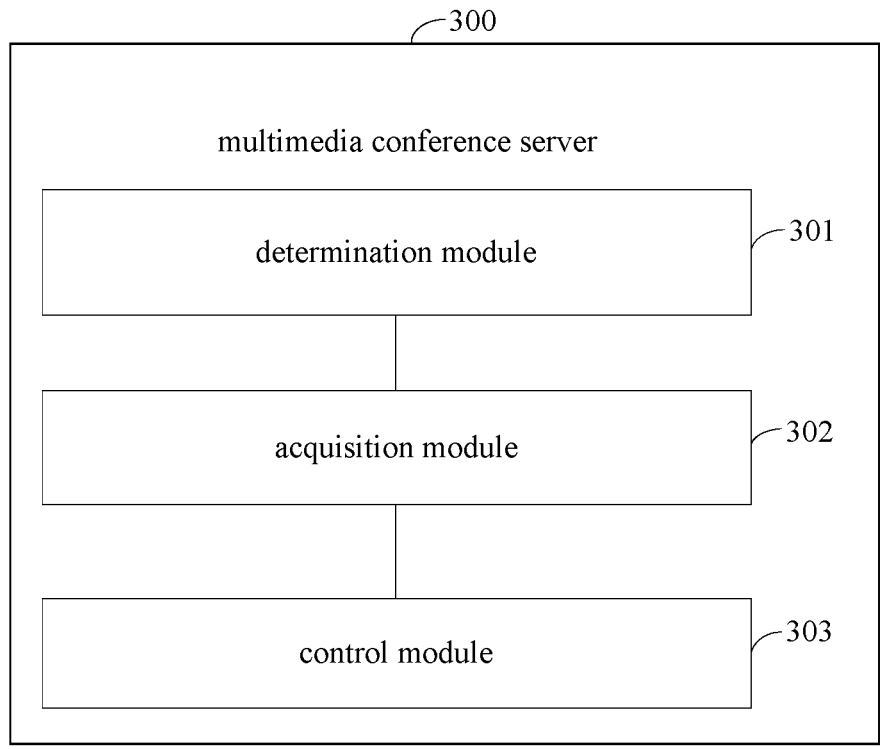
FIG. 3 is a schematic structural diagram of a multimedia conference server according to an embodiment of the present disclosure.

FIG. 3 is a schematic structural diagram of a multimedia conference server according to an embodiment of the present disclosure.

Referring to FIG. 3, a multimedia conference server 300 according to an embodiment of the present disclosure may include a determination module 301, an acquisition module 302, and a control module 303.

The determination module 301 is configured to determine whether multimedia information of a conference site collected by a multimedia conference terminal meets a preset condition. If the determination module 301 determines that the multimedia information does not meet the preset condition, the acquisition module 302 acquires the multimedia information of the conference site collected by the multimedia conference terminal. If the determination module 301 determines that the multimedia information meets the preset condition, the control module 303 closes the multimedia conference terminal.

According to an embodiment of the present disclosure, the determination module 301 may include: a first determination unit, a notification unit and a second determination unit. The first determination unit determines whether first multimedia information of the conference site collected by the multimedia conference terminal meets a first preset condition. If the first multimedia information does not meet the first preset condition, the first determination unit determines that the multimedia information does not meet the preset condition; if the first multimedia information meets the first preset condition, the notification unit displays notification information on the multimedia conference terminal, and the second determination unit determines whether second multimedia information of the conference site collected by the multimedia conference terminal meets a second preset condition, and if the second multimedia information does not meet the second preset condition, the second determination unit determines that the multimedia information does not meet the preset condition; and if the second multimedia information meets the second preset condition, the second determination unit determines that the multimedia information meets the preset condition.

According to an embodiment of the present disclosure, when the first multimedia information is audio information, the first determination unit may be configured to: determine whether the first multimedia information has a volume smaller than a preset first volume threshold; determine that the first multimedia information does not meet the first preset condition if the volume of the first multimedia information is larger than or equal to the preset first volume threshold; determine a first duration of a first state corresponding to that the volume of the first multimedia information is smaller than the preset first volume threshold if the volume of the first multimedia information is smaller than the preset first volume threshold; determine whether the first duration exceeds a preset first time threshold; determine that the first multimedia information meets the first preset condition if the first duration exceeds the preset first time threshold; and determine that the first multimedia information does not meet the first preset condition if the first duration does not exceed the preset first time threshold. When the first multimedia information is video information, the first determination unit may be configured to: determine whether a portrait can be recognized from the first multimedia information; determine that the first multimedia information does not meet the first preset condition if a portrait can be recognized from the first multimedia information; determine a second duration of a second state corresponding to that no portrait can be recognized from the first multimedia information if no portrait can be recognized from the first multimedia information; determine whether the second duration exceeds a preset second time threshold; determine that the first multimedia information meets the first preset condition if the second duration exceeds the preset second time threshold; and determine that the first multimedia information does not meet the first preset condition if the second duration does not exceed the preset second time threshold.

According to an embodiment of the present disclosure, when the second multimedia information is video information, the second determination unit may be configured to: determine whether a portrait can be recognized from the second multimedia information; determine that the second multimedia information does not meet the second preset condition if a portrait can be recognized from the second multimedia information; determine a third duration of a third state corresponding to that no portrait can be recognized from the second multimedia information if no portrait can be recognized from the second multimedia information; determine whether the third duration exceeds a preset third time threshold; determines that the second multimedia information meets the second preset condition if the third duration exceeds the preset third time threshold; and determine that the second multimedia information does not meet the second preset condition if the third duration does not exceed the preset third time threshold. When the second multimedia information is audio information, the second determination unit may be configured to: determine whether the second multimedia information has a volume smaller than a preset second volume threshold; determine that the second multimedia information does not meet the second preset condition if the volume of the second multimedia information is larger than or equal to the preset second volume threshold; determine a fourth duration of a fourth state corresponding to that the volume of the second multimedia information is smaller than the preset second volume threshold if the volume of the second multimedia information is smaller than the preset second volume threshold; determine whether the fourth duration exceeds a preset fourth time threshold; determine that the second multimedia information meets the second preset condition if the fourth duration exceeds the preset fourth time threshold; and determine that the second multimedia information does not meet the second preset condition if the fourth duration does not exceed the preset fourth time threshold.

According to an embodiment of the present disclosure, when the first multimedia information is audio and video information, the first determination unit may be configured to: determine whether the first multimedia information has a volume smaller than a preset third volume threshold and whether a portrait can be recognized from the first multimedia information; determine that the first multimedia information does not meet the first preset condition if the volume of the first multimedia information is larger than or equal to the preset third volume threshold or a portrait can be recognized from the first multimedia information; determine a fifth duration of a fifth state corresponding to that the volume of the first multimedia information is smaller than the preset third volume threshold and no portrait can be recognized from the first multimedia information if the volume of the first multimedia information is smaller than the preset third volume threshold and no portrait can be recognized from the first multimedia information; determine whether the fifth duration exceeds a preset fifth time threshold; determine that the first multimedia information meets the first preset condition if the fifth duration exceeds the preset fifth time threshold; and determine that the first multimedia information does not meet the first preset condition if the fifth duration does not exceed the preset fifth time threshold.

According to an embodiment of the present disclosure, when the second multimedia information is audio and video information, the second determination unit may be configured to: determine whether the second multimedia information has a volume smaller than a preset fourth volume threshold and whether a portrait can be recognized from the second multimedia information; determine that the second multimedia information does not meet the second preset condition if the volume of the second multimedia information is larger than or equal to the preset fourth volume threshold or a portrait can be recognized from the second multimedia information; determine a sixth duration of a sixth state corresponding to that the volume of the second multimedia information is smaller than the preset fourth volume threshold and no portrait can be recognized from the second multimedia information if the volume of the second multimedia information is smaller than the preset fourth volume threshold and no portrait can be recognized from the second multimedia information; determine whether the sixth duration exceeds a preset sixth time threshold; determine that the second multimedia information meets the second preset condition if the sixth duration exceeds the preset sixth time threshold; and determine that the second multimedia information does not meet the second preset condition if the sixth duration does not exceed the preset sixth time threshold.

The multimedia conference server according to the embodiments of the present disclosure may implement every step of the control method of the multimedia conference terminal, which is not repeatedly described herein.

Figure 4:
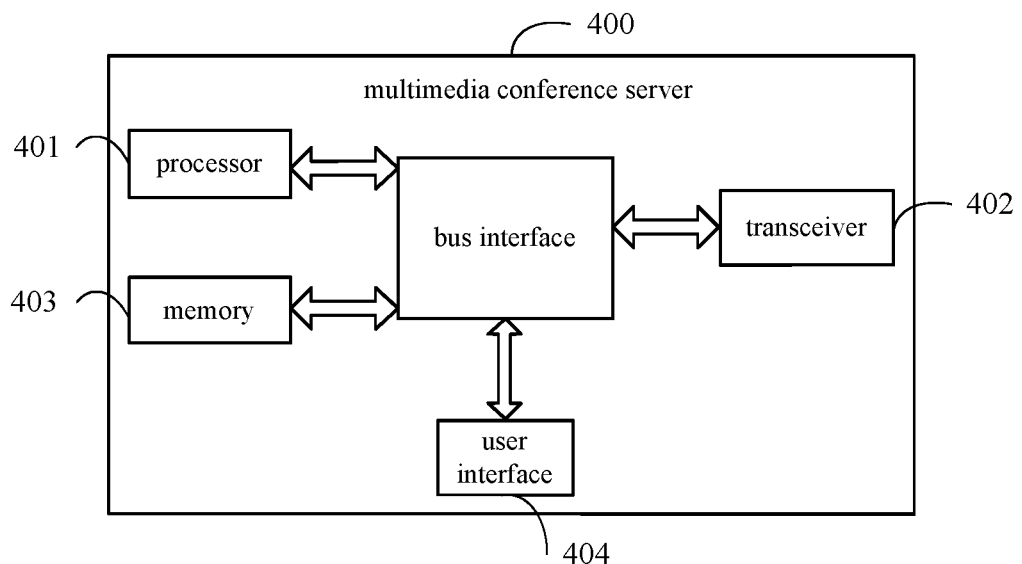
FIG. 4 is a block diagram of a multimedia conference server according to another embodiment of the present disclosure.

FIG. 4 is a block diagram of a multimedia conference server according to another embodiment of the present disclosure.

Referring to FIG. 4, the multimedia conference server 400 may include a processor 401, a transceiver 402, a memory 403, a user interface 404, and a bus interface. a computer program operable on the processor 401 is stored in the memory 403. When the computer program is executed by the processor 401, the processor 401 may perform the control method of a multimedia conference terminal according to each embodiment of the present disclosure.

In FIG. 4, the bus may include any number of interconnecting buses and bridges, and links together various circuits, particularly, one or more processors represented by the processor 401 and a memory represented by the memory 403. The bus 824 may also link together various other circuits such as peripherals, voltage regulators, and power management circuits, etc., which are well known in the art, and therefore, will not be described any further herein. The bus interface provides an interface. The transceiver 402 may be a plurality of elements, that is, includes a transmitter and a receiver, and provides a unit for communicating with various other devices over a transmission medium. For different use devices, the user interface 404 may be an interface capable of connecting a desired device, and the connected device includes but not limited to a keypad, display, speaker, microphone, joystick, etc.

The processor 401 is responsible for managing the bus and general processing, and the memory 403 may store data used by the processor 401 in performing operations.

Figure 5:
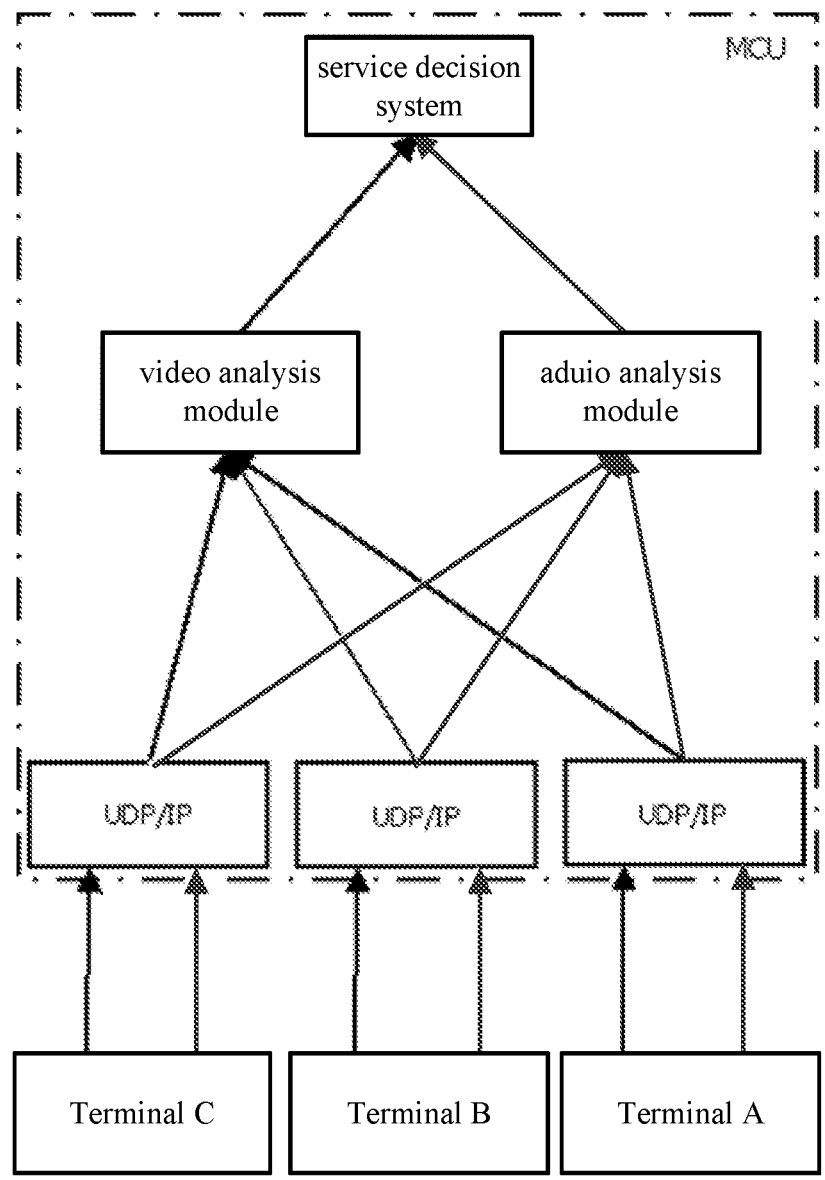
FIG. 5 is a schematic structural diagram of a multimedia conference server according to another embodiment of the present disclosure.

FIG. 5 is a schematic structural diagram of a multimedia conference server according to another embodiment of the present disclosure.

Referring to FIG. 5, a multimedia conference server according to an embodiment of the present disclosure includes a Multi Controller Unit (MCU). The MCU is essentially a multimedia information switch, and can perform multipoint calling and connection, and realize functions of video broadcasting, video selection, audio mixing, data broadcasting, etc., so as to implement tandem and switching of signals of respective terminals. For example, a camera of each terminal collects data and then data undergoes video coding, and the video data then reaches the MCU in the video conference system through the network. The MCU performs operations such as decoding, analysis, synthesis processing, and the like on the received video data, and finally sends the video data to the terminal through the network. After the terminal decodes the video data, a remote image is displayed on a display screen (a mobile phone screen, a television or a projection). After a microphone of each terminal collects audio data, the audio data undergoes audio coding, and the audio data then reaches the MCU in the conference television system through the network. The MCU performs operations such as decoding, analysis, audio mixing, encoding and the like on the received audio data, and finally sends the audio data to the terminal through the network. After the terminal decodes the audio data, sound of the conference is sent out through a device to complete the loop of the audio in a conference television system.

According to an embodiment of the present disclosure, the MCU may include a port connected to a terminal, a video analysis module, an audio analysis module, and a service decision system. The video analysis module may be configured to perform operations such as decoding, analysis, synthesis processing and the like on received video data. For example, the video analysis module may analyze whether there is a portrait in video data collected from the terminal. The audio analysis module may be configured to perform operations such as decoding, analysis, audio mixing, encoding and the like on received audio data. For example, the audio analysis module may analyze whether an input energy (i.e., volume) of audio data collected from the terminal is smaller than a certain normal value or whether a human voice can be recognized. It should be noted that in the present embodiment, the specific structure of the MCU is not specifically limited.

Embodiments of the present disclosure also provide a computer-readable storage medium on which a computer program is stored, and when the computer program is executed by a processor, the processor can perform the control method of a multimedia conference terminal according to the embodiments of the present disclosure.

It should be appreciated that reference throughout this specification to "one embodiment" or "an embodiment" means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In various embodiments of the present disclosure, it should be understood that the sequence numbers of the above processes do not indicate the sequence of executing the steps. The execution sequence of each process should be determined by its function and inherent logic, and should not constitute any limitation to the implementation process of the embodiments of the present disclosure.

In several embodiments provided in the present disclosure, it should be understood that the disclosed method and apparatus may be implemented in other manners. For example, the apparatus embodiments are merely illustrative, for example, the division of the units is only one type of logical functional division, and in actual implementation, there may be other division manners. For example, multiple units or components may be combined or may be integrated into another system, or some features may be ignored or not executed. In addition, the mutual coupling or direct coupling or communication connection shown or discussed may be an indirect coupling or communication connection through some interfaces, devices or units, and may be in an electrical, mechanical or other form.

In addition, functional units in the embodiments of the present disclosure may be integrated into one processing unit, or each unit may be separately and physically included, or two or more units may be integrated into one unit. The integrated unit may be implemented in the form of hardware, or in the form of hardware plus a software functional unit.

The integrated unit implemented in the form of a software functional unit may be stored in a computer-readable storage medium. The software functional unit is stored in a storage medium and includes several instructions to enable a computer device (which may be a personal computer, a server, a network-side device, or the like) to execute part of steps of the method according to various embodiments of the present disclosure. The storage medium includes various media capable of storing program codes, such as a U-disk, a portable hard disk, a Read-Only Memory (ROM), a Random Access Memory (RAM), a magnetic disk, an optical disk, and the like.

Exemplary implementations of the present disclosure have been described above, it will be appreciated that modifications and variations may be made by those skilled in the art without departing from the principle of the present disclosure, and these modifications and variations are also considered to be within the scope of the present disclosure.

What is claimed is:

1. A control method of a multimedia conference terminal comprises:
   determining whether multimedia information of a conference site collected by the multimedia conference terminal meets a preset condition;
   if the multimedia information does not meet the preset condition, acquiring multimedia information of the conference site collected by the multimedia conference terminal; and
   if the multimedia information meets the preset condition, closing the multimedia conference terminal,
   wherein the step of determining whether multimedia information of a conference site collected by the multimedia conference terminal meets a preset condition comprises:
   determining whether first multimedia information of the conference site collected by the multimedia conference terminal meets a first preset condition;
   if the first multimedia information does not meet the first preset condition, determining that the multimedia information does not meet the preset condition;
   if the first multimedia information meets the first preset condition, displaying notification information on the multimedia conference terminal and determining whether second multimedia information of the conference site collected by the multimedia conference terminal meets a second preset condition;
   if the second multimedia information does not meet the second preset condition, determining that the multimedia information does not meet the preset condition; and
   if the second multimedia information meets the second preset condition, determining that the multimedia information meets the preset condition,
   wherein the first multimedia information is audio and video information, and the second multimedia information is audio and video information;
   wherein the step of determining whether first multimedia information of the conference site collected by the multimedia conference terminal meets a first preset condition comprises:
   determining whether a volume of the first multimedia information is smaller than a preset first volume threshold;
   if the volume of the first multimedia information is larger than or equal to the preset first volume threshold, determining that the first multimedia information does not meet the first preset condition;
   if the volume of the first multimedia information is smaller than the preset first volume threshold, determining a first duration of a first state corresponding to that the volume of the first multimedia information is smaller than the preset first volume threshold;
   determining whether the first duration exceeds a preset first time threshold;
   if the first duration exceeds the preset first time threshold, determining that the first multimedia information meets the first preset condition; and
   if the first duration does not exceed a preset first time threshold, determining that the first multimedia information does not meet the first preset condition;
   wherein the step of determining whether first multimedia information of the conference site collected by the multimedia conference terminal meets a first preset condition comprises:
   determining whether a portrait is recognized from the first multimedia information;
   if the portrait is recognized from the first multimedia information, determining that the first multimedia information does not meet the first preset condition;
   if no portrait is recognized from the first multimedia information, determining a second duration of a second state corresponding to that no portrait is recognized from the first multimedia information;
   determining whether the second duration exceeds a preset second time threshold;
   if the second duration exceeds the preset second time threshold, determining that the first multimedia information meets the first preset condition; and
   if the second duration does not exceed the preset second time threshold, determining that the first multimedia information does not meet the first preset condition;
   wherein the step of determining whether second multimedia information of the conference site collected by the multimedia conference terminal meets a second preset condition comprises:
   determining whether a portrait is recognized from the second multimedia information;
   if the portrait is recognized from the second multimedia information, determining that the second multimedia information does not meet the second preset condition;
   if no portrait is recognized from the second multimedia information, determining a third duration of a third state corresponding to that no portrait is recognized from the second multimedia information;
   determining whether the third duration exceeds a preset third time threshold;
   if the third duration exceeds the preset third time threshold, determining that the second multimedia information meets the second preset condition; and if the third duration does not exceed the preset third time threshold, determining that the second multimedia information does not meet the second preset condition;

wherein the step of determining whether second multimedia information of the conference site collected by the multimedia conference terminal meets a second preset condition comprises:

determining whether a volume of the second multimedia information is smaller than a preset second volume threshold;

if the volume of the second multimedia information is larger than or equal to the preset second volume threshold, determining that the second multimedia information does not meet the second preset condition;

if the volume of the second multimedia information is smaller than the preset second volume threshold, determining a fourth duration of a fourth state corresponding to that the volume of the second multimedia information is smaller than the preset second volume threshold;

determining whether the fourth duration exceeds a preset fourth time threshold;

if the fourth duration exceeds the preset fourth time threshold, determining that the second multimedia information meets the second preset condition; and if the fourth duration does not exceed the preset fourth time threshold, determining that the second multimedia information does not meet the second preset condition;

wherein the step of determining whether first multimedia information of the conference site collected by the multimedia conference terminal meets a first preset condition comprises:

determining whether a volume of the first multimedia information is smaller than a preset third volume threshold and whether a portrait is recognized from the first multimedia information;

if the volume of the first multimedia information is larger than or equal to the preset third volume threshold or the portrait is recognized from the first multimedia information, determining that the first multimedia information does not meet the first preset condition;

if the volume of the first multimedia information is smaller than the preset third volume threshold and no portrait is recognized from the first multimedia information, determining a fifth duration of a fifth state corresponding to that the volume of the first multimedia information is smaller than the preset third volume threshold and no portrait is recognized from the first multimedia information;

determining whether the fifth duration exceeds a preset fifth time threshold;

if the fifth duration exceeds the preset fifth time threshold, determining that the first multimedia information meets the first preset condition; and if the fifth duration does not exceed the preset fifth time threshold, determining that the first multimedia information does not meet the first preset condition;

wherein the step of determining whether second multimedia information of the conference site collected by the multimedia conference terminal meets a second preset condition comprises:

determining whether a volume of the second multimedia information is smaller than a preset fourth volume threshold and whether a portrait is recognized from the second multimedia information;

if the volume of the second multimedia information is larger than or equal to the preset fourth volume threshold or the portrait is recognized from the second multimedia information, determining that the second multimedia information does not meet the second preset condition;

if the volume of the second multimedia information is smaller than the preset fourth volume threshold and no portrait is recognized from the second multimedia information, determining a sixth duration of a sixth state corresponding to that the volume of the second multimedia information is smaller than the preset fourth volume threshold and no portrait is recognized from the second multimedia information;

determining whether the sixth duration exceeds a preset sixth time threshold;

if the sixth duration exceeds the preset sixth time threshold, determining that the second multimedia information meets the second preset condition; and if the sixth duration does not exceed the preset sixth time threshold, determining that the second multimedia information does not meet the second preset condition.

2. A multimedia conference server, comprising a memory storing thereon a computer program and a processor which, when executing the computer program, performs the control method of a multimedia conference terminal according to claim 1.

3. A non-transitory computer-readable storage medium, storing thereon a computer program which, when executed by a processor, causes the processor to execute the control method of a multimedia conference terminal according to claim 1.

4. A multimedia conferencing server with a processor, comprising:

a determination module configured to determine whether multimedia information of a conference site collected by a multimedia conference terminal meets a preset condition through the processor;

an acquisition module configured to acquire multimedia information of the conference site collected by the multimedia conference terminal through the processor if the determination module determines that the multimedia information does not meet the preset condition; and a control module configured to close the multimedia conference terminal through the processor if the determination module determines that the multimedia information meets the preset condition, wherein the determination module comprises a first determination unit, a notification unit, and a second determination unit, the first determination unit determines whether first multimedia information of the conference site collected by the multimedia conference terminal meets a first preset condition through the processor, if the first multimedia information does not meet the first preset condition, the first determination unit determines that the multimedia information does not meet the preset condition through the processor, if the first multimedia information meets the first preset condition, the notification unit displays notification information on the multimedia conference terminal, and the second determination unit determines whether second multimedia information of the conference site collected by the multimedia conference terminal meets a second preset condition through the processor, if the second multimedia information does not meet the second preset condition, the second determination unit determines that the multimedia information does not meet the preset condition through the processor, and if the second multimedia information meets the second preset condition, the second determination unit determines that the multimedia information meets the preset condition through the processor;

wherein the first multimedia information is audio and video information, and the second multimedia information is audio and video information;

wherein the first determination unit is configured, through the processor, to:

determine whether a volume of the first multimedia information is smaller than a preset first volume threshold;

if the volume of the first multimedia information is larger than or equal to the preset first volume threshold, determine that the first multimedia information does not meet the first preset condition;

if the volume of the first multimedia information is smaller than the preset first volume threshold, determine a first duration of a first state corresponding to that the volume of the first multimedia information is smaller than the preset first volume threshold;

determine whether the first duration exceeds a preset first time threshold;

if the first duration exceeds the preset first time threshold, determine that the first multimedia information meets the first preset condition; and if the first duration does not exceed the preset first time threshold, determine that the first multimedia information does not meet the first preset condition;

wherein the first determination unit is further configured, through the processor, to:

determine whether a portrait is recognized from the first multimedia information;

if the portrait is recognized from the first multimedia information, determine that the first multimedia information does not meet the first preset condition;

if no portrait is recognized from the first multimedia information, determine a second duration of a second state corresponding to that no portrait is recognized from the first multimedia information;

determine whether the second duration exceeds a preset second time threshold;

if the second duration exceeds the preset second time threshold, determine that the first multimedia information meets a first preset condition; and if the second duration does not exceed the preset second time threshold, determine that the first multimedia information does not meet the first preset condition;

wherein the second decision unit is configured, through the processor, to:

determine whether a portrait is recognized from the second multimedia information;

if the portrait is recognized from the second multimedia information, determine that the second multimedia information does not meet the second preset condition;

if no portrait is recognized from the second multimedia information, determine a third duration of a third state corresponding to that no portrait is recognized from the second multimedia information;

determine whether the third duration exceeds a preset third time threshold;

if the third duration exceeds the preset third time threshold, determine that the second multimedia information meets the second preset condition; and if the third duration does not exceed the preset third time threshold, determine that the second multimedia information does not meet the second preset condition;

wherein the second decision unit is further configured, through the processor, to:

determine whether a volume of the second multimedia information is smaller than a preset second volume threshold;

if the volume of the second multimedia information is larger than or equal to the preset second volume threshold, determine that the second multimedia information does not meet the second preset condition;

if the volume of the second multimedia information is smaller than the preset second volume threshold, determine a fourth duration of a fourth state corresponding to that the volume of the second multimedia information is smaller than the preset second volume threshold;

determine whether the fourth duration exceeds a preset fourth time threshold;

if the fourth duration exceeds the preset fourth time threshold, determine that the second multimedia information meets the second preset condition; and if the fourth duration does not exceed the preset fourth time threshold, determine that the second multimedia information does not meet the second preset condition;

wherein the first determination unit is further configured, through the processor, to:

determine whether a volume of the first multimedia information is smaller than a preset third volume threshold and whether a portrait is recognized from the first multimedia information;

if the volume of the first multimedia information is larger than or equal to the preset third volume threshold or the portrait is recognized from the first multimedia information, determine that the first multimedia information does not meet the first preset condition;

if the volume of the first multimedia information is smaller than the preset third volume threshold and no portrait is recognized from the first multimedia information, determine a fifth duration of a fifth state corresponding to that the volume of the first multimedia information is smaller than the preset third volume threshold and no portrait is recognized from the first multimedia information;

determine whether the fifth duration exceeds a preset fifth time threshold;

if the fifth duration exceeds the preset fifth time threshold, determine that the first multimedia information meets the first preset condition; and if the fifth duration does not exceed the preset fifth time threshold, determine that the first multimedia information does not meet the first preset condition;

wherein the second decision unit is further configured, through the processor, to:

determine whether a volume of the second multimedia information is smaller than a preset fourth volume threshold and whether a portrait is recognized from the second multimedia information;

if the volume of the second multimedia information is larger than or equal to the preset fourth volume threshold or the portrait is recognized from the second multimedia information, determine that the second multimedia information does not meet the second preset condition;

if the volume of the second multimedia information is smaller than the preset fourth volume threshold and no portrait is recognized from the second multimedia information, determine a sixth duration of a sixth state corresponding to that the volume of the second multimedia information is smaller than the preset fourth volume threshold and no portrait is recognized from the second multimedia information;
determine whether the sixth duration exceeds a preset sixth time threshold;
if the sixth duration exceeds the preset sixth time threshold, determine that the second multimedia information meets the second preset condition; and
if the sixth duration does not exceed the preset sixth time threshold, determine that the second multimedia information does not meet the second preset condition.

* * * * *